United States Patent [19]
Meertens

[11] Patent Number: 4,810,893
[45] Date of Patent: Mar. 7, 1989

[54] IMAGE-DETECTOR FOR HIGH ENERGY PHOTON BEAMS

[75] Inventor: Harm Meertens, Hoofddorp, Netherlands

[73] Assignee: Vereniging Het Nederlands Kankerinstituut, Amsterdam, Netherlands

[21] Appl. No.: 843,134

[22] Filed: Mar. 24, 1986

[30] Foreign Application Priority Data

Mar. 26, 1985 [NL] Netherlands ........................ 8500875

[51] Int. Cl.⁴ ........................................ G01T 1/185
[52] U.S. Cl. ................................ 250/385.1; 250/374
[58] Field of Search ................................ 250/385, 374

[56] References Cited

U.S. PATENT DOCUMENTS

| | | | |
|---|---|---|---|
| 3,609,435 | 9/1971 | Taylor | 250/385 |
| 3,911,279 | 10/1975 | Gilland et al. | 250/385 |
| 3,975,639 | 8/1976 | Allemand | 250/385 |

OTHER PUBLICATIONS

Frolova et al., "Reproduction of the Rad., by Means of a Liquid Ion. Chamb.", Translated from Izmeritel Naga Tekhnilson, No. 7, p. 82 (Jul. 1975).

Sargrove et al, "Multiwire Prop. Chamber," Nucl. Inst. & Meth. 113, No. 1 (1973).
Med. Phys. 6 (6), 1979, pp. 487–493.
Phys. Med. Biol. 29(12), 1984, pp. 1527–1535.
Med. Phys. 12(1), 1985, pp. 111 to 113.

*Primary Examiner*—Janice A. Howell
*Assistant Examiner*—Richard Hanig
*Attorney, Agent, or Firm*—Rosen, Dainow & Jacobs

[57] ABSTRACT

Image-detector for depicting differences in intensity in high energy photon beams with the aid of a photon-sensitive element, the photon-sensitive element is an ionization chamber, consisting in the main of two mainly equivalent plates of an electrically insulating material, which are attached to each other by a ring-shaped electrically insulating part as a divider, while the outer walls of both plates are covered with electrically conductive material, whereby one of the plates is equipped with a number of parallel high voltage electrodes over a central part of its inner wall and the other plate is equipped over a central part of its inner wall with a number of parallel ionization current electrodes which extend perpendicularly towards the high voltage electrodes, while the inner walls of both plates around the central parts are covered with an electrically conductive material and a liquid dieectric is situated in the space between the plates.

1 Claim, 1 Drawing Sheet

FIG. 1
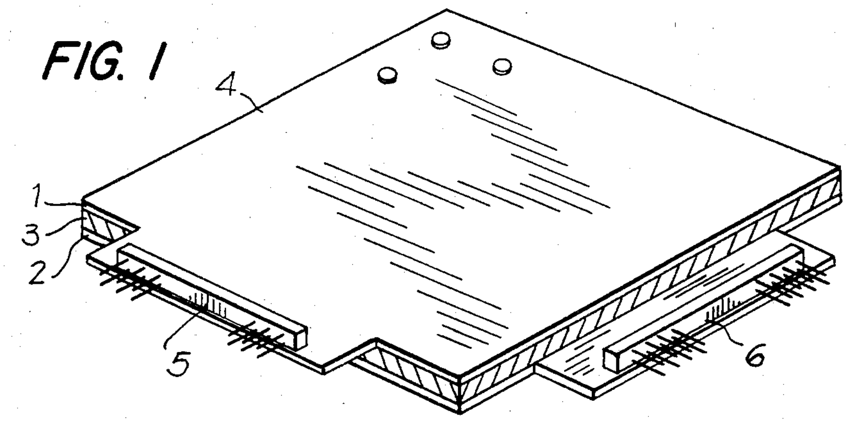
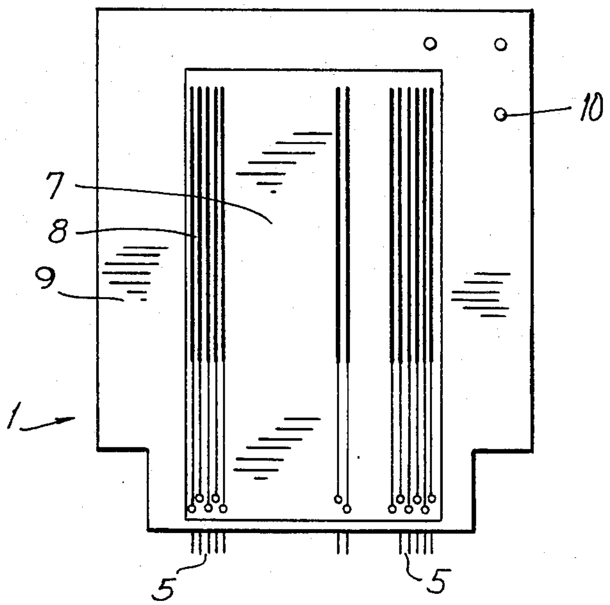
FIG. 2
FIG. 3
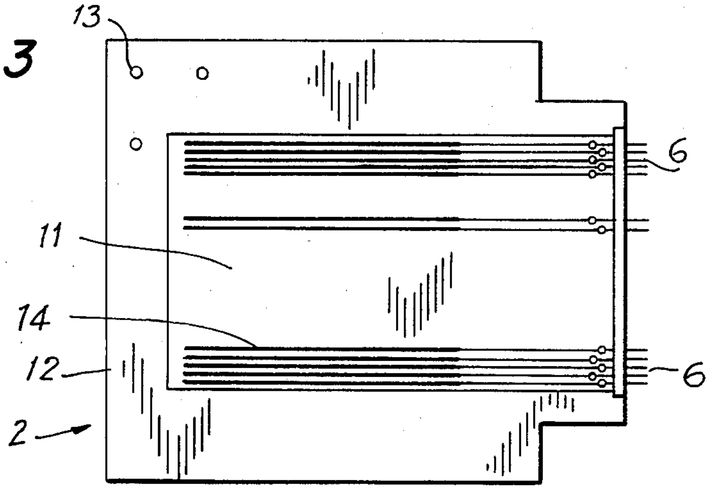

IMAGE-DETECTOR FOR HIGH ENERGY PHOTON BEAMS

The invention concerns an image detector for depicting differences in intensity in high energy photon beams with the aid of a photon-sensitive element.

Such photon beams are applied when treating tumours with ionising photon beams. In this connection high energy is taken to mean: with an energy greater than 1 MeV.

Image detectors which are generally used in radiotherapy such as metal-screen X-ray film detectors, are generally shown and are described i.a. in Med. Phys. 6 (6), 1979, page 487–493. During an irradiation session, or a part thereof, this type of detector is situated in the path of the beam on the exit side of a patient. The purpose of image detectors is to be able to increase the accuracy of the irradiation by emitting the desired absorbed dose of the ionising radiation in a reproducible manner to the part which it is planned to irradiate. It is therefore possible to administer a maximum dose to the target area, through which irradiation of adjacent tissues can be kept to a minimum.

The image quality of the X-ray film images obtained with the known detectors, in particular the low and high contrast resolutions, made with high energy photons is considerably worse than the film images made with photon energies as applied in conventional radiodiagnosis. The possibilities to improve the image qualities of the X-ray films are very limited.

It is desirable for radiotherapy to be able to compare the so-called verification image, made with the therapeutic photon irradiation during an absorbed dose administration to the patient, with the so-called localisation image, made from the planned beam adjustment with the aid of the low energy photon beam of the localiser.

It is not possible in daily clinical practise to accurately quantify, on the basis of film images on a negatoscope, the differences between the obtained set-up of the radiation beam in relation to the patient, verification film, and the planned set-up, localisation film.

The disadvantages of the metal screen-film detector mentioned with respect to image quality and image analysis can be considerably reduced if, once the images have been digitalised, use is made of digital methods of image processing, as concerns both improvement of image quality and the application of techniques for pattern recognition. Use of digital image processing methods is described, for example, in Phys. Med. Biol. 29 (12), 1984, page 1527 to 1535 and in Med. Phys. 12 (1), 1985, page 111 to 113.

An important remaining disadvantage is that use is still made of an X-ray film, which must be digitalised after development, for example with the aid of a TV camera coupled to a computer. Furthermore, the exposure range of X-ray film imposes limitations on working with irradiation devices, which means an increased work burden.

The aim of the invention is to provide a digital image detector for high energy photon beams with which an image can be obtained which makes verification of the set-up of a beam in relation to the patient possible. The construction must be such that routine use for radiotherapy is possible.

An image detector according to the invention is for that purpose characterised in that the photon sensitive element is an ionisation chamber, consisting in the main of two mainly equivalent plates of electrically insulating material, which are attached to each other by a ring-shaped electrically insulating part as a divider, whilst the outer walls of both plates are covered with electrically conducting material, whereby one of the plates is equipped with a number of high voltage electrodes over a central part of its inner wall, and the other plate is equipped over a central part of its inner wall with a number of parallel ionisation current electrodes which extend perpendicularly towards the high voltage electrodes, whilst the inner walls of both plates around the central parts are covered with electrically conductive material and a liquid dielectric is situated in the space between the plate parts.

In the matrix ionisation chamber which is filled with a liquid the electrical signals, called ionization currents, of the separate cells, corresponding with the points in the digital image matrix, are sampled in a very short time because of the fact that separate lines of the matrix ionization chamber are very quickly provided with voltage by a high voltage selector system, that is the high voltage electrodes are separately provided with voltages in a predetermined series of combinations, and because of the fact that the ionization currents of separate columns of the matrix ionization chamber are sampled very quickly by a multi-channel electrometer amplifier, that is the ionization current electrodes whereby the control of the high voltage selection electronics and the sampling electronics take place by a micro processor system and whereby integration of measured ionization currents takes place digitally, that is ionization currents are digitally integrated.

In one design of a matrix ionization chamber according to the invention, the part thereof in which the measured ionizations are generated consists of a rectangular parellelepiped. This cavity is filled with a liquid dielectric into which free charge carriers are induced by ionizing electrons, which come into being after interaction of photons with the detector.

In general the following requirements are made of the liquid: it must be a-polar, be a good electrical insulator, have sufficient mobility of free charge carriers, and be very pure. By very pure is meant a pollution of less than approximately 50 P.P.M. Pure saturated hydrocarbons of the $C_nH_{2n+2}$ group, cyclopentane, cyclohexane and tetramethylsilane for example comply with these qualities. Qualities of such liquid dielectrics are described further i.a. in Brit. J. Appl. Phys., 16, 1965, page 759 to 769 and in Nuclear Instruments and Methods 39, 1966, page 339 to 342.

The top side of the cavity is limited by a thin plate of insulating material which is equipped on the liquid side with a number of oblong shaped, parallel high voltage electrodes, whilst the bottom side of the cavity is limited by an identical thin plate of insulating material which is equipped also on the liquid side with a number of oblong shaped parallel ionization current electrodes. Both electrode surfaces run parallel to one another, divided by the liquid, whilst the longitudinal directions of both series of electrodes are perpendicular to one another, so that each intersection of a high voltage electrode and an ionization current electrode corresponds with a matrix cell.

After digitalization on the sampled ionization currents are used to reconstruct an image, whereby a correction is applied for differences in zero adjustment of the channels of the electrometer, for differences in sensitivity of the separate matrix ionization chamber cells, and whereby the image is restored by an image processing which corrects for the image blurring effect of the detector (convolution with the inverse point spread function).

In this way a digital megavolt photon image is obtained with a detector which has external measurements comparable with those of a cassette in which normally the X-ray film and the metal plates of the detector which has been widely used up to now are placed.

With the detector according to the invention it is thereby possible to leave the detector in the beam during the entire time of dose administration by an irradiation field during an irradiation session, whereby it is possible to carry out data acquisition of a number of images, which can be constructed separately or which can be reconstructed together into an image with less noise.

The high contrast resolution and the amount of noise in the image depend closely on the dimensions of an ionization chamber cell. A 128×128 matrix with a cell area of 2.0×2.0 mm gives an image area of 260×260 mm and an image quality which is suitable for depicting relatively small irradiation fields whilst the same matrix size with a cell area of 3.5×3.5 gives an image area of 450×450 mm, suitable for depicting relatively large irradiation fields.

The most important advantages of a detector according to the invention can be named as:

the design of the matrix ionization chamber is very sample, so that a detector, for example 128×128 cells or 256×256 cells, can be constructed relatively easily;

all cells are filled with the same homogenous liquid, so that the differences in radiation sensitivity of the separate matrix cells are small;

the detector does not contain any mechanically moving components;

very fast sampling of the ionization currents of the cells is possible;

the ionization currents can be measured during the entire period of irradiation, so that the signal to noise ratio can be improved by taking the average of a number of image matrices.

As far as areas of application other than radiotherapy are concerned it can be stated that the invention can be used for all purposes of image creation with high energy photon beams. Factors which particularly determine the applicability are the flux density of the beam, the available time of exposure of the object to be depicted and the movement patterns of the object to be depicted.

One example of a construction of an image detector of high energy photon beams according to the invention has a matrix ionization chamber with 32×32 cells, with electrode plates made of double sided printed circuit board as applied for printed electronic circuits with an insulation material thickness of 1.6 mm and a conductive copper layer on both sides with a thickness of 0.04 mm, with an electrode length of 90 mm, an electrode width of 1.25 mm and with a center distance between the electrodes of 2.54 mm. The ionization chamber cavity is filled with 2,2,4 trimethylpentane as a liquid dielectric, while a sealing ring of silicone rubber between the high voltage electrode plate and the ionization current electrode plate makes the cavity liquid tight, and while the plate distinct is set at 1.0 mm. The 32 channel high voltage selector system can switch a high voltage electrode from a potential of 0 V to a potential of a maximum of 300 V within 1 ms. The 32 channel electrometer amplifier can sample 32 ionization currents within 320 μs. The results of images of test objects show that the high contrast resolution amounts to approximately 1.5× the cell size and that the noise in the image amounts to approximately 0.5% for a photon flux density of 0.5 $Gy.min^{-1}$ and for a recording time of 1 s.

The invention will be explained further according to the drawing, in which:

FIG. 1 shows a design of a liquid matrix ionization chamber in perspective and

FIG. 2 and FIG. 3 schematically show the insides of the upper and lower plates of the chamber.

In FIG. 1, 1 and 2 are two plates of electrically insulating material, which in conjunction with the electrically insulating ring-shaped divider form the matrix ionization chamber.

The plates 1 and 2 are both covered on their outer sides with an electrically conductive layer 4. The plate 1 is equipped on its inner side with high voltage electrodes, which are joined via a connector 5. 6 represents the connector for the ionization current electrodes, which are mounted on the inner side of plate 2.

FIG. 2 shows the inner side of plate 1. Mounted on a central part 7 thereof, which is rectangular in the drawn example, are the high voltage electrodes 8 which are equidistant to one another. The edge 9 around the central part is covered with an electrically conductive layer. The edge is equipped with means 10 for attaching plate 1 to divider 3 and plate 2.

FIG. 3 shows the inner side of plate 2. Plate 2 looks just the same as plate 1: a central middle part 11, an edge 12, which is covered with an electrically conductive layer, and means for attachment 13. For this plate the central part 11 is equipped with the ionization current electrodes 14 which are equidistant to one another. The direction of these electrodes, which lie in a plane equidistant to that in which the high voltage electrodes lie, is perpendicular to that of the high voltage electrodes.

The electrodes 8 and 14 are situated in the cavity which is formed within the ring-shaped divider 3 and which is limited on the upper and lower sides by the central parts 7 and 11 of the plates 1 and 2. In this cavity the liquid dielectric is also situated.

I claim:

1. Image-detector for depicting differences in intensity in high energy photon beams with the aid of a photon-sensitive element, comprising an ionization chamber, two substantially equivalent plates of an electrically insulating material, attached to each other by a ring-shaped electrically insulating divider, the outer walls of both plates being covered with electrically conductive material, one of the plates equipped with a number of parallel high voltage electrodes over a central part of its inner wall and the other plate equipped over a central part of its inner wall with a number of parallel ionization current electrodes extending perpendicular towards the high voltage electrodes, the inner walls of both plates around the central parts being covered with an electrically conductive material, and a liquid dielectric being situated in the space between the plates wherein the high voltage electrodes are provided with voltage separately and in a previously determined series of electrode voltage combinations with the aid of a controlled high voltage selector system, such that currents by the ionization current electrodes are separately measured with the aid of a multi-channel electrometer amplifier circuit.

* * * * *

UNITED STATES PATENT AND TRADEMARK OFFICE
CERTIFICATE OF CORRECTION

PATENT NO. : 4,810,893

DATED : March 7, 1989

INVENTOR(S) : Harm Meertens

It is certified that error appears in the above-identified patent and that said Letters Patent is hereby corrected as shown below:

Column 1, line 20, change "radiation" to --irradiation--.
Column 3, line 31, change "sample" to --simple--.

Signed and Sealed this

First Day of December, 1992

*Attest:*

DOUGLAS B. COMER

*Attesting Officer*

*Acting Commissioner of Patents and Trademarks*